(12) United States Patent
Chan

(10) Patent No.: US 6,390,719 B1
(45) Date of Patent: May 21, 2002

(54) JOINT OF A SUPPORTING FRAME

(75) Inventor: Shin Jung Chan, Taipei (TW)

(73) Assignee: Chun Jin Co., Ltd., Taipei Hsien (TW)

( * ) Notice: Subject to any disclaimer, the term of this patent is extended or adjusted under 35 U.S.C. 154(b) by 0 days.

(21) Appl. No.: 09/515,207

(22) Filed: Feb. 29, 2000

(51) Int. Cl.[7] .................................................. F16B 1/00
(52) U.S. Cl. ...................... 403/205; 52/646; 52/656.9; 446/126
(58) Field of Search ................................. 211/189, 191, 211/182; 248/235, 250; 52/646, 643, 648.1, 649.8, 651.1, 656.9; 446/126, 120, 108, 116, 125; 403/187, 217, 219, 169, 170, 171, 176, 192

(56) References Cited

U.S. PATENT DOCUMENTS

| 1,400,066 A | * | 12/1921 | Huck |
| 1,608,592 A | * | 11/1926 | Funk |
| 2,156,155 A | * | 4/1939 | Howard |
| 4,271,654 A | * | 6/1981 | Jungbluth |
| 4,637,180 A | * | 1/1987 | Zeigler ........................ 446/126 |

* cited by examiner

Primary Examiner—Lynne H. Browne
Assistant Examiner—Tomlyne A Malcolm
(74) Attorney, Agent, or Firm—Rosenberg, Klein & Lee

(57) ABSTRACT

The present invention is directed to a joint of a supporting frame, which includes a basic unit to connecting with one to six connecting units at a related side plate. The connecting unit can connect with related crossbeams to assembling a supporting frame; wherein each connecting unit has provided with a folded elastic plate at both ends with a related groove therebetween to engage with an end of the crossbeam. The basic unit is cubic and has one side opening, which can be sealed by a door to form a complete cubic hollow unit. By use of the basic unit engaging with desired connecting units, it provides the joints with various configurations, which can be used at any position in a supporting frame.

4 Claims, 5 Drawing Sheets

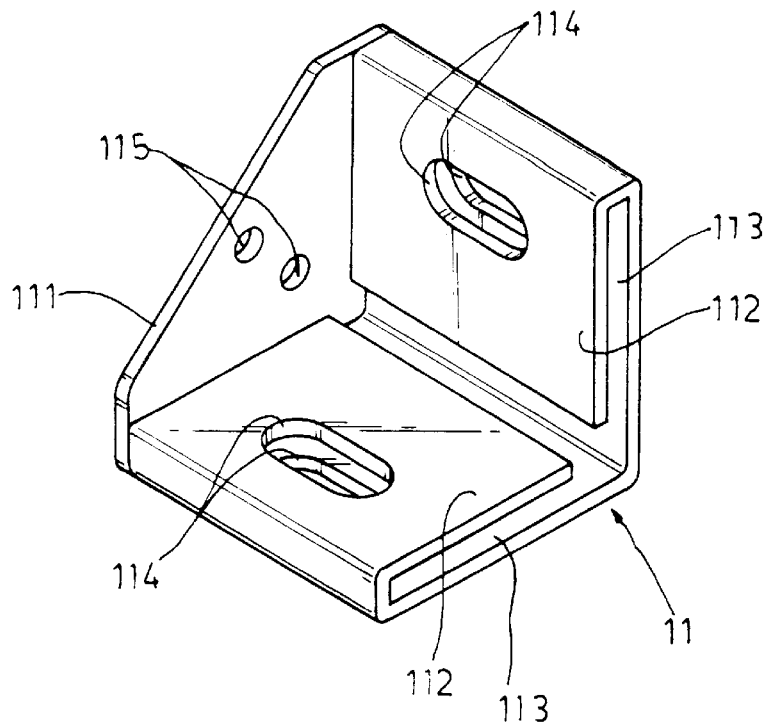
F I G. 2
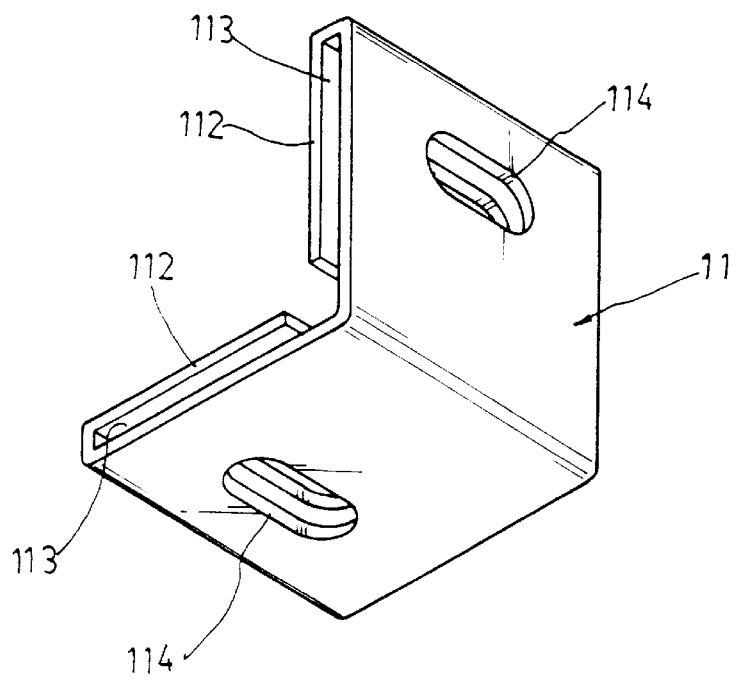
F I G. 3

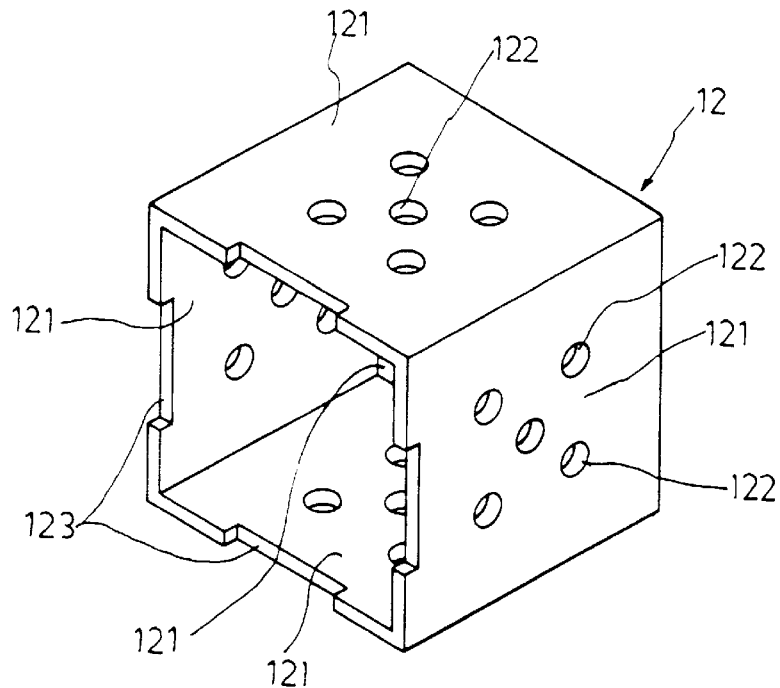
F I G. 4
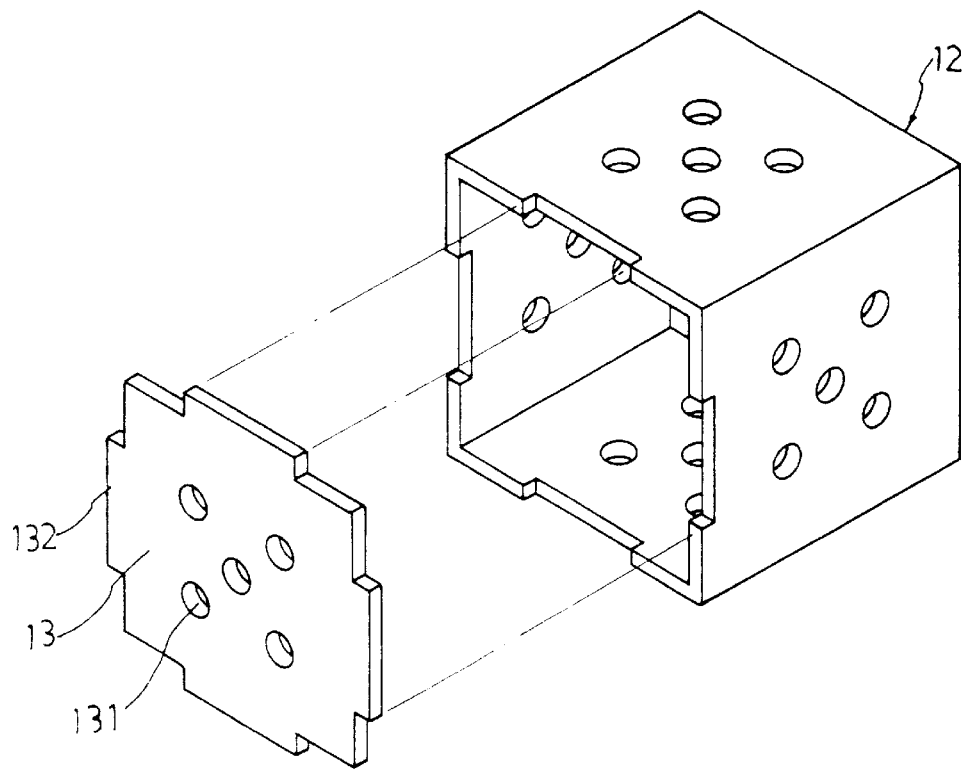
F I G. 5

JOINT OF A SUPPORTING FRAME

BACKGROUND OF THE INVENTION

A conventional supporting frame is assembled by a plurality of joints and supporting rods to become a frame, which can be formed with various configurations. It is known that the joint must be made with different shape for connecting with one rod, two rods, three rods, four rods, five rods, or six rods at a different position in a cubic frame similar to a supporting frame shown in FIG. 7. Since many various joints are necessary for assembling a supporting frame, the manufactured cost will be high and the assembly will be more difficult as well as trouble. Moreover, if one certain joint is lacked, another can not replace it and the supporting frame could not be completed.

In view of the above problems, the primary object of the invention is to provide an improved structure of the joint of a supporting frame to overcome prior known drawbacks. Now the features and advantages of the present invention will be described in detail with reference to the accompanying drawings.

BRIEF DESCRIPTION OF ACCOMPANYING DRAWINGS

FIG. 2 is a perspective view of a connecting unit of the joint according to the present invention.

FIG. 3 is a perspective view of FIG. 2 in another direction.

FIG. 4 is a perspective view of a basic unit of the joint according to the present invention.

FIG. 5 is a perspective view of FIG. 4 sealed with a door.

DETAILED DESCRIPTION OF PREFERRED EMBODIMENTS

Figure 1:
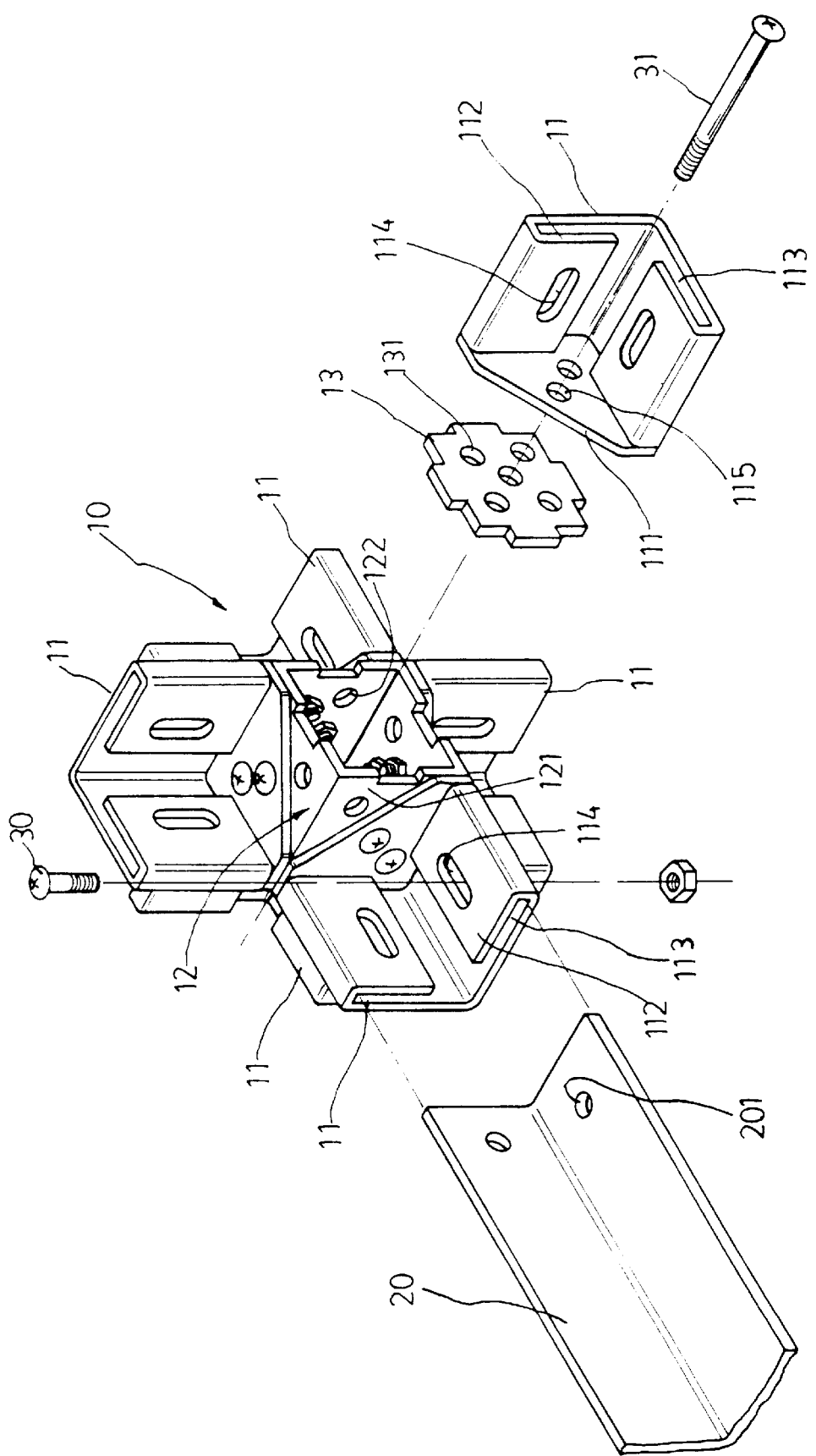
FIG. 1 is a perspective view of a joint and a connecting crossbeam according to the present invention.

Referring to FIGS. 1 to 5, a joint (10) of the present invention is comprised of a basic unit (12) and one or more connecting unit (11). As shown in FIGS. 2 and 3, the connecting unit (11) being L-shape has provided with an inner folded elastic plate (112) at both ends with a related groove (113) therebetween. The plate (112) and both sides of the unit (11) are provided with a related aperture (114). Two holes (115) are formed on a side plate (111) of the connecting unit (11).

Referring to FIG. 4, the basic unit (12) is cubic and hollow without one side. The other five side plates (121) are formed with five holes (122) thereon. Each opening end of the side plate (121) is provided with a groove (123). Accompanying with FIG. 1, it can be understood that the assembly of the joint (10) will be completed by connecting the side plate (111) of the unit (11) with one side plate (121) of the basic unit (12) with two screws (30) penetrated into the holes (115) on the plate (111) and a central hole (122) and one selected hole (122) on the side plate (121) of the basic unit (12). A door (13) having five holes (131) thereon are provided to seal the opening of the basic unit (12) after other connecting units (11) are screwed up by a related nut in the cubic unit. A long screw (31) is provided for passing through the central hole of the door (13) and the related hole of the connecting unit at both sides to complete a joint (10). By use of the design of this invention, a basic unit (12) can engage with one to six connecting unit (11) that provides various configuration of the joint for desired use in assembling a supporting frame when it connects with related crossbeam (20). Each crossbeam (20) provided with an end hole (201) can be engaged within the groove (113) of the unit (11) and fixed by another screw (30) penetrated the aperture (114) and the hole (201).

Figure 6:
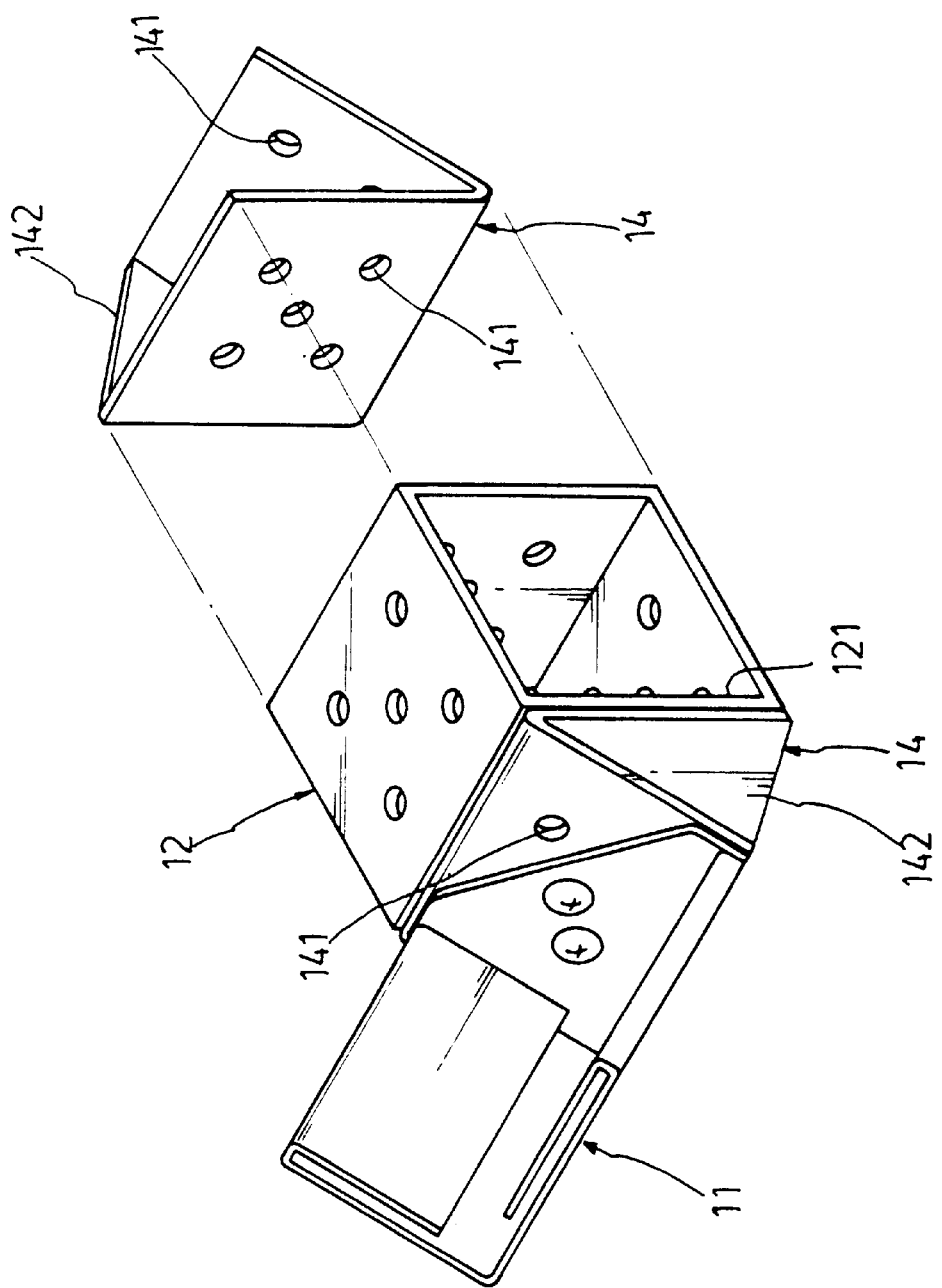
FIG. 6 is a perspective view of a conversing unit with a special angle of the joint according to the present invention.
Figure 7:
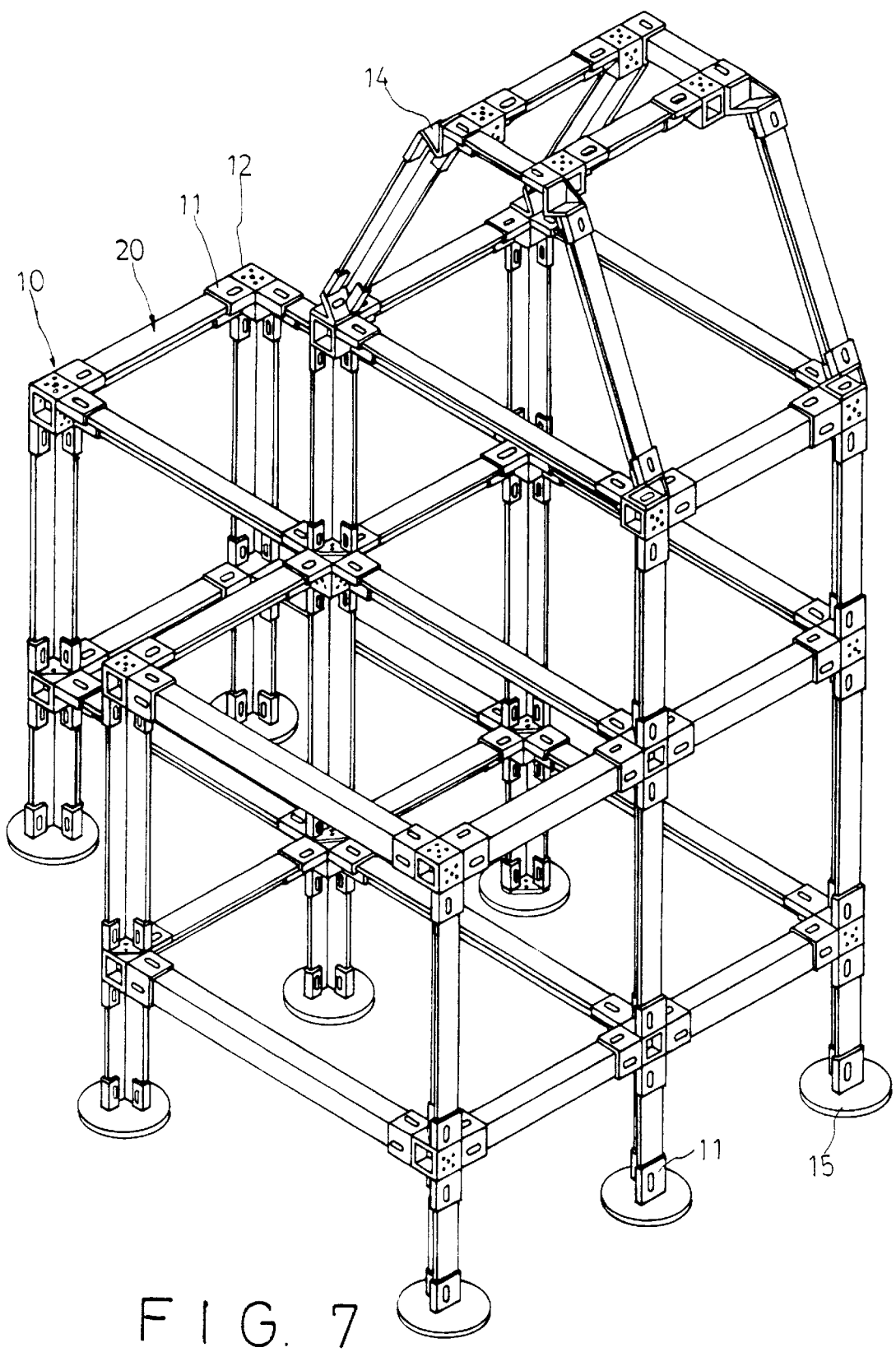
FIG. 7 is a perspective view of a supporting frame according to the present invention.

Referring to FIG. 6, it can seen that a conversing unit (14) is provided with a special angle, which can be 15 degree, 30 degree, and so on. It has two connecting plates with five holes (141) thereon relating to the holes (122) on the basic unit (12) and a side plate (142). The connecting unit (11) is capable of being connected with the conversing unit (14) in a similar way as with the basic unit (12). Each conversing unit (14) is then connected with the basic unit (12) by screwing up. Due to an inclined direction provided by the conversing unit, a different configuration of supporting frame is provided. The supporting frame can be a cubic configuration with top inclined rack or any other desired structure. Of cause, a circular plate (15) with connecting units thereon can be provided when the frame is going to stand as shown in FIG. 7.

The present invention makes use of a joint, which can be manufactured easily to form various configurations to connect with one to six crossbeams and complete a cubic frame and/or an inclined rack. Thus it has excellent practical value in the field. Evidently the invention has the essence of a patent. We hereby apply for a patent grant.

What is claimed is:

1. A joint assembly for a frame structure comprising:
   (a) a basic unit including a plurality of substantially rectangular first side plate portions forming substantially an open cubic configuration defining an open side;
   (b) a door portion removably coupled to said open side of said basic unit; and,
   (c) a plurality of connecting units each coupled to at least one of said first side plate and door portions, each said connecting unit including a pair of end plate portions and a second side plate portion extending transversely therebetween, said end plate portions being angularly offset one from the other, said end plate portions each having an inner plate section and inner folded elastic plate section defining thereagainst a groove space for slidably receiving a crossbeam end.

2. The joint assembly as recited in claim 1 wherein said second side plate portion of said connecting unit has formed therein al least a pair of apertures, and each said first side plate portion of said basic unit has formed therein at least five holes.

3. The joint assembly as recited in claim 2 wherein at least one said connecting unit is secured to said basic unit by at least a pair of fastening screws passed though said apertures and holes respectively of said second side plate and first side plate portions.

4. The joint assembly as recited in claim 1 further comprising at least one conversing unit joining said basic unit and one said connecting unit, said conversing unit including a pair of conversing end plate portions angularly offset one from the other by a predetermined incline angle.

* * * * *